United States Patent Office 3,528,687
Patented Sept. 15, 1970

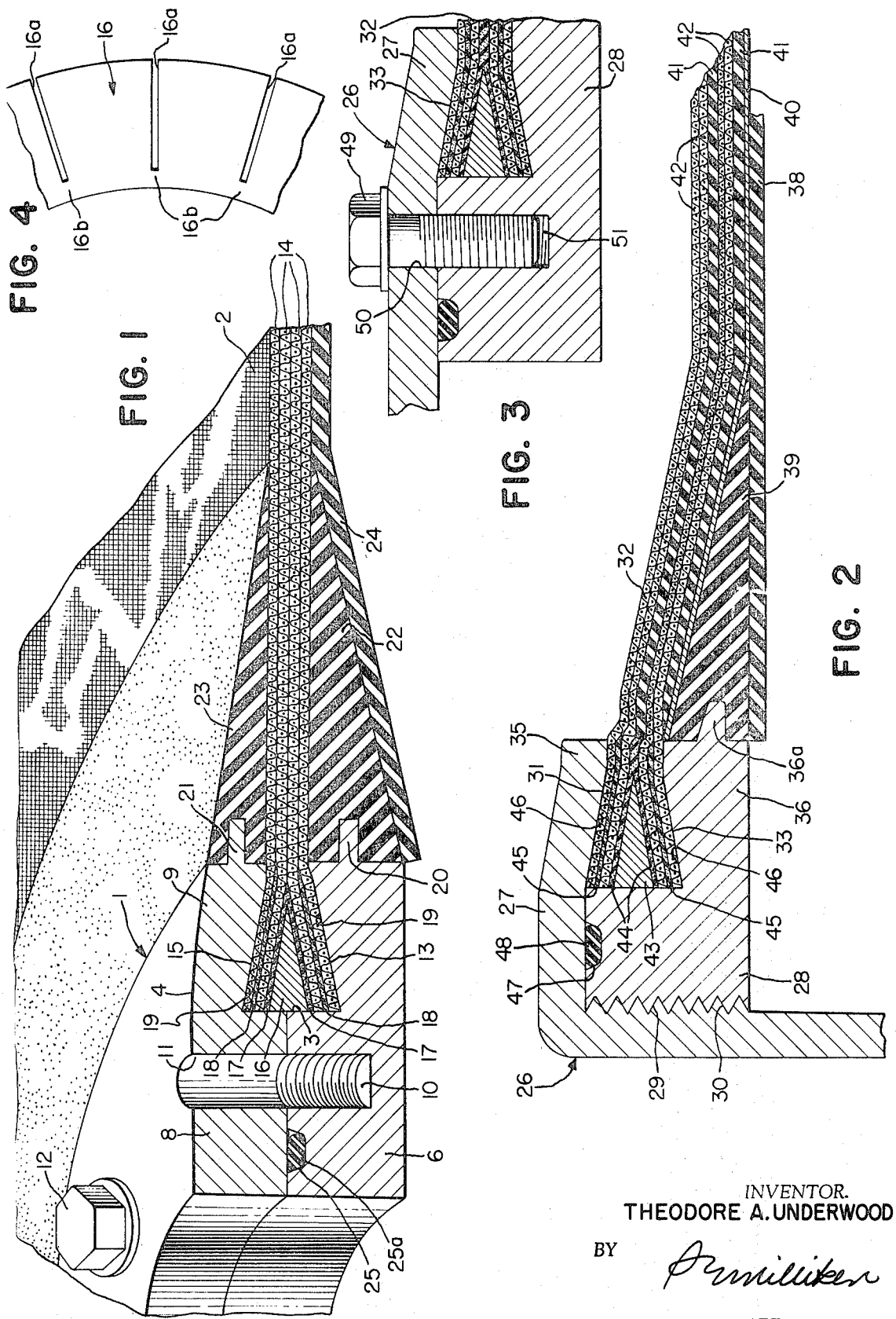

3,528,687
FITTING FOR A FLEXIBLE WALLED CONTAINER
Theodore A. Underwood, Cuyahoga Falls, Ohio, assignor to The Goodyear Tire & Rubber Company, Akron, Ohio, a corporation of Ohio
Filed Sept. 13, 1968, Ser. No. 759,579
Int. Cl. F16l 5/00
U.S. Cl. 285—200                                           15 Claims

ABSTRACT OF THE DISCLOSURE

A fitting attached to an aperture in a flexible walled container such as a crash resistant self-sealing fuel tank or the like which requires a high-strength leak-proof joint between the container wall and the fitting to prevent pull-out of the fitting when the tank is subjected to high impact loads. A wedge-shape ring is positioned between layers of the tank wall to provide a thickened rim portion around an aperture in the tank wall to which the fitting is attached. The fitting is comprised of a pair of opposed rings which are fastened together in face-to-face relationship on each side of the rim to retain the fitting in the aperture. The cross-sectional contour of the two rings is such that when fastened together, they define a radially outwardly extending channel having a tapered contour which is complementary in cross section to the cross-sectional contour of the rim to which the fitting is attached. In some instances, the two rings of the fitting may contain mating threaded portions to permit the rings to be screwed together. The rings may also be fastened together by bolts or other means. Various types of attachments may be fastened to the fitting depending upon the particular purpose for which the aperture is used.

---

This invention relates to a high strength leak proof fitting for a flexible walled liquid container such as a crash resistant fuel tank in which it is required that the fitting will not pull loose from the wall of the tank when the tank is subjected to high impact loads.

BACKGROUND OF THE INVENTION

In the past, many kinds of fittings have been devised for attachment to the flexible wall of fuel tanks at various apertures in the tank such as access openings, filler inlet tubes and fuel outlet lines. The problem encountered is to obtain a strong leakproof joint between a rigid fitting and a flexible wall of the fuel tank. Typical examples of such prior art fitting joints may be seen in Pats. No. 2,743,752, No. 2,772,101, No. 2,884,978 and No. 3,129,014. One common disadvantage of all the joints shown in these prior art patents is that in all cases, holes were required in the wall of the tank to permit bolts or other fastening means to actually pass through the tank wall adjacent the edge of the aperture. To put such fastener holes in the tank wall requires additional labor and makes the tank more expensive. In addition, such holes will weaken the tank wall and under severe stress, the tank may tend to tear out in the area of the holes. Another disadvantage of using such holes through the tank wall is that any wicking of fuel between the tank walls and the fittings may tend to seep out through the holes and create a fire hazard or other problems.

OBJECTS OF THE INVENTION

It is a primary object of this invention to provide a simple leakproof, high strength joint between a rigid fitting and a flexible wall of a fluid container which does not require connection holes in the container wall.

Another object of this invention is to provide a joint which is easy to manufacture and easy to assemble.

A still further object of this invention is to provide a fitting joint which will prevent the fitting from pulling loose from the container wall when the container is subjected to high impact loads.

These and other objects of the invention will become more fully apparent as the description proceeds in the following specification and the attached drawings.

BRIEF DESCRIPTION OF THE DRAWINGS

FIG. 1 is a partially broken away perspective view through a fuel tank fitting showing one embodiment of the invention;

FIG. 2 is a fragmentary cross-sectional view through another embodiment of the invention showing a modification of the fitting shown in FIG. 1 and showing a modification in the construction of the fuel tank wall;

FIG. 3 shows a fragmentary cross-sectional view of another modification of a fitting usable with the tanks shown in FIGS. 1 or 2; and FIG. 4 shows a fragmentary plan view of a wedge shaped intermediate ring used in the invention.

DESCRIPTION OF THE PREFERRED EMBODIMENTS

Referring now to FIG. 1 of the drawings, a fitting indicated generally by the numeral 1 is attached to a fuel tank wall 2 at a wall aperture 3. The fitting 1 has an outer ring 4 positioned on the outside of the fuel tank wall 2 and an inner ring 5 positioned on the inside thereof. The inner ring 5 has a radially inner body portion 6 and an integral flange 7 extending radially outwardly therefrom. Similarly, the outer ring 4 has a radially inner body portion 8 which has an integral flange 9 extending radially outwardly therefrom. The body portion 6 contains a plurality of blind threaded holes 10 located in spaced relationship around the circumference of the body portion 6. The body portion 8 has a plurality of plain holes 11 passing therethrough and in such spaced relationship that when the outer ring 4 and the inner ring 5 are assembled together in their normal position, the holes 10 and 11 will be in axial alignment for receiving a bolt 12 through each pair of matching holes to fasten the rings 4 and 5 together. The opposed facing surfaces of the flanges 7 and 9 are inclined at such an angle to each other that when the rings 4 and 5 are assembled together, the flanges 7 and 9 form therebetween a wedge-shaped, radially outwardly extending channel 13, which is widest at the radially innermost portion thereof and tapers to its narrowest dimension at the radially outer portion thereof. As may be seen in FIG. 1, the tank wall 2 is a laminated structure made from a plurality of plies 14 of fabric reinforced fluid impervious material. The plies 14 are preferably woven nylon cloth impregnated with nitrile rubber or urethane resin. A wedge-shaped rim 15 is formed around the circumference of the aperture 3 by placing an intermediate wedge-shaped ring 16 between one or more of the plies 14 adjacent the edge of the aperture 3. The ring 16 is thickest at its inside diameter and tapers to a thinner cross section at its outside diameter. The ring 16 is attached to the plies 14 by layers 17 of high tensile strength adhesive. A typical adhesive which would be suitable for this purpose is epoxy adhesive capable of 1% to 5% elongation and having a tensile strength of 5,000 to 10,000 p.s.i. The plies 14 are bonded together in the area of the rim 16 by layers 18 which are preferably of high tensile strength adhesive similar to that used in the layers 17. The rim 15 is clamped between inner wall surfaces 19 of the channel 13 and no adhesive is used therebetween. When the fuel tank is subjected to high impact loads and a pull is exerted between the tank wall 2 and the fitting 1 tending to pull the fitting loose from the tank wall, the adhesive layers 17 and 18 hold the plies 2 and the ring 16 intact to maintain the wedge-shaped rim 15 but since there is no adhesive between the rim 15 and the inner surfaces 19, the rim 15 will move radially outwardly a short distance in the wedge-shaped channel 13 and wedge itself more firmly against the walls of the channel, thereby insuring that the fitting 1 will not pull loose from the tank wall 2. In order for the ring 16 to move radially outwardly as required, it must be made either from a material such as low strength polyester resin or other plastic material which will fracture radially at various places around its circumference or if the ring 16 is made of metal such as aluminum or steel or other metals it must contain radial slots 16a shown in FIG. 4 spaced at various positions around its circumference to permit it to fracture at locations 16b between the radially inner ends of the slots 16a and the radially inner edge of the ring 16. In addition the ring 16 must be made of hard material which will permit only a small amount of deflection when subjected to compression or stress caused by the pull of the tank wall 2, otherwise the deflection of the ring would permit the rim 15 to be pulled through the narrow part of the channel 13. As shown in FIG. 1, the ring 16 is made of metal however it may be made of a plastic material such as a urethane resin which may be reinforced by fabric materials or various types of fibers or may be used without reinforcement. It may be seen in FIG. 1 that the rim 15 is complementary in cross-sectional contour to the cross-sectional contour of the wedge-shaped channel 13 formed by the rings 4 and 5. Since the rim 15 is thicker at its radially inner portion, it is retained by the flanges 7 and 9 and provides a high strength joint between the fitting 1 and the tank wall 2 which will not pull out when the tank is subjected to high impact loads but will provide the wedging action described above. An annular groove 17 is provided in the axially outer face of the body portion 6 of the ring 5 for holding an O ring 18 to provide a seal between the rings 4 and 5. Other grooves (not shown) may be provided where needed on the surfaces of the fitting 1 to receive O rings to create a seal between the fitting 1 and any other type of attachment such as a cover lid or the like which may be attached thereto. The rings 4 and 5 may be fastened together in many various ways, in addition to being bolted together as shown in FIG. 1.

The flanges 7 and 9 have auxiliary flanges 20 and 21 respectively extending radially outwardly therefrom around which are molded tapered filler rings 22 and 23 respectively. The filler rings 22 and 23 stiffen the wall adjacent the fitting 1 and reduce undesirable flexing of the wall at the filling juncture which may cause leakage in that portion of the tank wall. In addition to stiffening the tank wall, the filler ring 21 on the inside of the tank wall 2 provides a positive seal between the wall and the tank fitting 1 to prevent any seepage of fuel either in a liquid or gaseous state between the tank wall and the fitting. The rings 22 and 23 are made preferably of nitrile rubber or urethane resin depending upon the composition of the plies 14. A fue impervious inner liner 24 covers the interior of the fuel tank wall 2 and overlaps the inner filler ring 22 to further seal the fitting 1 and the tank wall 2. The liner 24 may also be made of nitrile rubber, urethane resin or any other material which is compatible with the other tank materials used. An annular groove 25 is provided in the surface of the body portion 6 of the ring 5 for receiving an O-ring 25a which creates a seal between the rings 4 and 5 to prevent fuel from seeking between the rings and reaching the edges of the plies 14.

FIG. 2 shows another embodiment of the invention having a different ring configuration and a different tank wall construction which provides a self sealing tank in which the tank wall when punctured by a bullet or other projectile will automatically seal the opening. In FIG. 2, a fitting 26 has an outer ring 27 and an inner ring 28. The rings 27 and 28 are fastened together by matching threaded portions 29 and 30 with the ring 27 being screwed into the ring 28. When fastened together, the rings form an annular radially outwardly extending channel 31 of wedge-shaped cross section similar to the channel 12 shown in FIG. 1. A tank wall 32 has an annular wedge shaped rim 33 similar to the rim 15 in FIG. 1. The rim 33 is held within the channel 31 by radially outwardly extending flanges 35 and 36 of the rings 27 and 28 respectively. The construction of the tank wall 32 and the manner in which the fitting 26 is connected thereto will now be described.

The innermost layer of the wall 32 is comprised of an elastomeric inner liner 38 of fluid impervious material such as nitrile rubber or the like suitable for containing liquid fuel. Outside the layer 38 and surrounding the fitting 26 is a filler ring 39 of nitrile rubber or other suitable elastomeric material which has a wedge-shaped cross-sectional contour with the thickest portion being located radially inwardly next to the periphery of the flange 36 of the ring 28. An auxiliary flange 36a extends radially outwardly from the periphery of the flange 36 to provide a joint between the radially inner edge of the filler ring 39 and the flange 36 and eliminate a hinge point at their juncture which would be weakened by flexing of the tank walls. The filler ring 39 provides a fluid tight smooth transition between the ring 28 and the inner surface of the tank wall 32. Overlapping the outside surface of the filler ring 39 and the inner liner 38 is a nylon barrier and tie ply 40 which provides a surface for attaching a sealant layer 41 of rubber material which swells when contacted by gasoline or similar fuels and seals any punctures which may occur in the tank wall. The sealant layer 41 is then covered by two fabric reinforced plies 42 of square woven nylon cloth coated with rubber similar to the sealant layer 41. The plies 42 are then followed by a second sealant layer 41 and then by two more fabric reinforced plies 42 which form the outer cover of the fuel tank wall 32. In constructing the wedge-shaped rim 33 at the edge of the tank opening, a wedge-shaped metal ring 43 is positioned between the plies 42 with two of the plies 42 positioned against the outside surface of the ring 43 and two of the plies 42 positioned against the inside surface of the ring. Adhesive layers 44 having high tensile strength are located between the ring 43 and the adjacent plies 42 to bond them together. Adhesive layers 45 also of high tensile strength similar to the layers 44 bond together two pairs of the plies 42. The adhesive used in layers 44 and 45 is similar to that used in layers 17 and 18 in FIG. 1. No adhesive is used between the rim 33 and the inner faces 46 of the channel 31. The reason for not using adhesive at this location is described previously with regard to FIG. 1 and will not be repeated. The sealant layers 41 do not extend into the area of the rim 33 since the sealant layers are made of a soft material such as uncured rubber or the like and would not be suitable for use in the area of the rim 33 since it is desirable that the rim 33 be of rather hard and stiff construction, and use of the sealant layers 41 in the rim area would make it difficult to produce a sufficiently rigid rim. The joint construction shown in FIG. 4 with the molded filler ring 39 is designed in such manner that liquid fuel contained within the tank will not wick out between the layers of the tank wall 32 and the fitting 26. To prevent wicking of fuel between the rings 27 and 28, the fitting 26 has an annular groove 47 in the outer surface of the ring 28 to receive an O-ring 48 which creates a seal between the rings 27 and 28. This seal prevents the fuel from reaching the edge of the tank wall and passing between the plies 42 to the sealant layers 41, thereby causing them to swell and damage the tank wall.

FIG. 3 illustrates a different manner of fastening together the rings 27 and 28 of the fitting 26. Instead of the threaded portions 29 and 30, a plurality of bolts 49 pass through holes 50 in the ring 27 and are screwed into threaded holes 51 in the ring 28. This clamps the rim 33 between the rings 27 and 28 and thereby secures the fitting 26 to the tank wall 32.

While certain specific configurations of fittings and certain tank wall constructions have been shown for the purpose of illustrating the invention, it will be understood that many modifications may be made, both in the cross-sectional contour of the rings of the fitting and in the various layers used in the tank wall without departing from the scope of the invention which contemplates the use of a wedge-shaped rim at the tank wall opening which is held in a wedge-shaped channel in the fitting. It will also be understood that there may be various ways of fastening together the outer and inner rings of the fitting in addition to those illustrated. The wedge-shaped intermediate ring located within the wedge-shaped rim portion of the tank wall may be made of metal, plastic or any other suitable material having sufficient rigidity and hardness and which is compatible for use with the layers of the tank wall being attached thereto.

Various other modifications may be made without departing from the scope of the invention.

What is claimed is:

1. A fitting for a flexible walled liquid container having an aperture surrounded by a thickened rim portion, said fitting comprising:
   (A) a pair of opposed rigid rings;
   (B) means for fastening together the rings in face-to-face relationship;
   (C) each ring having a radially outwardly extending flange inclined toward a comparable flange on the opposite ring, said flanges defining therebetween a wedge-shaped annular radially outwardly facing rim-receiving channel which is complementary in cross-section to the rim portion surrounding the aperture and which holds the rim portion therein when the opposed rings are fastened together, said channel being widest at the radially innermost portion and narrowest at the radially outermost portion thereof;
   (D) said rim portion surrounding the aperture being radially expandable;
   (E) the means for fastening together the rings being located radially inwardly from the rim-receiving channel; and
   (F) a resilient fillter ring of wedge-shaped cross-section molded against the radially outer edge of the radially outwardly extending flange of at least one of the opposed rigid rings.

2. A fitting as claimed in claim 1 wherein the rings are fastened together by bolts.

3. A fitting as claimed in claim 1 wherein the means for fastening together the rings comprises a male threaded portion on one ring and a female threaded portion on the opposite ring.

4. A fitting as claimed in claim 1 wherein the rings are of substantially identical cross-sectional contour.

5. A fitting as claimed in claim 1 wherein the radially outwardly extending flanges on each ring are of substantially identical cross-sectional contour but wherein one ring has a main body portion which is thicker in cross section than one opposed body portion on the other ring.

6. A fitting as claimed in claim 1 wherein one of the rings has an auxiliary flange extending radially outwardly from the periphery thereof with said filler ring bonded thereto to provide a stronger joint between the rigid ring and the filler ring.

7. A fitting as claimed in claim 6 wherein both of the rigid rings have an auxiliary flange and a resilient filler ring bonded thereto.

8. A fluid tight joint between a rigid fitting and a multi-layer apertured wall of a flexible container comprising:
   (A) a rim portion extending around the edge of at least one aperture of the container wall comprising:
      (1) a radially expandable intermediate ring member of substantially wedge-shaped cross section,
      (2) said ring being thickest in cross section at the radially inner edge thereof and tapering to a thinner cross section radially outwardly therefrom,
      (3) at least one layer of the container wall overlapping one side of the ring member,
      (4) at least one other layer of the container wall overlapping the opposite side of the ring,
      (5) both of said layers overlapping the ring member around the entire circumference thereof;
   (B) a rigid outer ring lying substantially outside the container;
   (C) a rigid inner ring lying substantially inside the container;
   (D) means fastening the inner and outer rings together in face-to-face relationship;
   (E) each of said rings having a radially outwardly extending flange one surface of which is inclined toward a comparable flange surface of the opposite ring and defining therebetween a radially outwardly facing tapered channel which is complementary in cross section to the rim portion and holds the rim portion therein when the top and bottom rings are fastened together; and
   (F) a resilient filler ring of wedge-shaped cross section molded against the radially outer edge of the radially outwardly extending flange of at least one of the rigid rings.

9. A fluid tight joint as claimed in claim 8 wherein the container wall comprises a plurality of fabric reinforced elastomeric layers having at least one layer of sealant material located therebetween, said sealant layer terminating short of the rim portion but said fabric reinforced layers extending into the rim portion and lying on each side of the intermediate ring member and being bonded to the intermediate ring member with high tensile strength adhesive and being clamped against said intermediate ring by the inner and outer rings.

10. A fluid tight joint as claimed in claim 9 including a fluid impervious barrier layer located inwardly in the container wall from the fabric reinforced layers and the sealant layers, said barrier layer terminating short of the rim portion.

11. A fluid tight joint as claimed in claim 10 including a fluid impervious inner liner located inwardly from and overlapping both the filler ring and the barrier layer.

12. A fluid tight joint as claimed in claim 8 wherein the intermediate ring is frangible to permit radial expansion thereof when the fitting is subjected to stresses which tend to pull it away from the container wall.

13. A fluid tight joint as claimed in claim 12 wherein the intermediate ring contains a plurality of radially outwardly facing slots spaced around the circumference thereof to permit radial fracture of the ring adjacent the slots when the ring is subjected to radially outwardly exerted stresses.

14. A fluid tight joint as claimed in claim 8 wherein the intermediate ring is metal.

15. A fluid tight joint as claimed in claim 8 wherein the intermediate ring is a resin material.

References Cited

UNITED STATES PATENTS

| | | | |
|---|---|---|---|
| 2,336,552 | 12/1943 | Langford | 285—200 X |
| 2,713,850 | 7/1955 | Bradbury et al. | |
| 2,940,778 | 6/1960 | Kaiser | 285—149 X |
| 2,978,004 | 4/1961 | Smith | 150—8 X |
| 3,190,332 | 6/1965 | Bernard | 285—200 X |
| 3,209,287 | 9/1965 | Oxner et al. | 285—149 X |
| 3,368,599 | 2/1968 | Dailey et al. | 150—.5 X |

DAVID J. WILLIAMOWSKY, Primary Examiner

W. L. SHEDD, Assistant Examiner

U.S. Cl. X.R.

150—.5; 285—225